(12) United States Patent
Gallucci

(10) Patent No.: US 10,392,214 B2
(45) Date of Patent: Aug. 27, 2019

(54) APPARATUS TO OVERTURN SHEETS AND/OR PANELS

(71) Applicant: ELITRON IPM S.r.l., Monte Urano (IT)

(72) Inventor: Giuseppe Gallucci, Monte Urano (IT)

(73) Assignee: ELITRON IPM S.R.L., Monte Urano (IT)

(*) Notice: Subject to any disclaimer, the term of this patent is extended or adjusted under 35 U.S.C. 154(b) by 14 days.

(21) Appl. No.: 15/745,888

(22) PCT Filed: Jul. 19, 2016

(86) PCT No.: PCT/IB2016/054288
§ 371 (c)(1),
(2) Date: Jan. 18, 2018

(87) PCT Pub. No.: WO2017/013583
PCT Pub. Date: Jan. 26, 2017

(65) Prior Publication Data
US 2018/0208422 A1    Jul. 26, 2018

(30) Foreign Application Priority Data
Jul. 21, 2015   (IT) .............................. MI2015A6169

(51) Int. Cl.
*B65G 49/06*    (2006.01)
*B65H 15/00*    (2006.01)
(Continued)

(52) U.S. Cl.
CPC ........... *B65H 15/00* (2013.01); *B65G 49/067* (2013.01); *B65G 49/068* (2013.01); *B65G 57/08* (2013.01);
(Continued)

(58) Field of Classification Search
CPC ........ B65H 15/00; B65H 3/0883; B65H 5/10; B65H 2406/342; B65H 2701/11312;
(Continued)

(56) References Cited

U.S. PATENT DOCUMENTS 2,022,242 A * 11/1935 Kristof ................. B65G 49/067
                                                                198/403
4,460,304 A *  7/1984 Dombach .............. B65G 57/08
                                                                198/374
(Continued)

FOREIGN PATENT DOCUMENTS

DE        2516498 A1    10/1976
DE        3030413 C1     2/1982
(Continued)

*Primary Examiner* — Lynn E Schwenning
(74) *Attorney, Agent, or Firm* — R. Neil Sudol; Henry D. Coleman

(57) ABSTRACT

In an apparatus for overturning sheets and/or panels, a bearing structure carries a loading plane, and roto-translation means vertically translate the loading plane and rotate the same with respect to an axis. A grab device carried by the loading plane serves to transfer a sheet and/or panel from a supply station, when stopped upstream of the apparatus, on an operating surface. A command and control unit in alternatively activating and de-activating the roto-translation means, the stabilization and transfer and the grab device, defines for the loading plane a collection position, an overturning position and an unloading position of a sheet and/or panel to be overturned by the supply station placed upstream of the apparatus, over an unloading station downstream of the apparatus.

14 Claims, 10 Drawing Sheets

(51) Int. Cl.
*B65G 57/08* (2006.01)
*B65G 59/04* (2006.01)
*B65G 60/00* (2006.01)
*B65H 5/10* (2006.01)
*B65H 3/08* (2006.01)

(52) U.S. Cl.
CPC ............. *B65G 59/04* (2013.01); *B65G 60/00* (2013.01); *B65H 3/0883* (2013.01); *B65H 5/10* (2013.01); *B65G 2249/04* (2013.01); *B65H 2406/342* (2013.01); *B65H 2701/11312* (2013.01)

(58) Field of Classification Search
CPC ...... B65G 49/068; B65G 60/00; B65G 57/08; B65G 59/04; B65G 49/067; B65G 2249/04; B65G 47/24; B27B 31/00
USPC .......... 414/796.5, 796.9, 797, 758, 781, 783
See application file for complete search history.

(56) References Cited

U.S. PATENT DOCUMENTS

| | | | | |
|---|---|---|---|---|
| 5,096,369 | A * | 3/1992 | Ouellette | B65G 60/00 414/763 |
| 2008/0182737 | A1* | 7/2008 | Jost | B21D 43/18 483/14 |
| 2011/0070059 | A1* | 3/2011 | Savoia | B65G 47/252 414/758 |
| 2012/0099956 | A1* | 4/2012 | Diehr | B65H 1/30 414/728 |
| 2015/0274440 | A1* | 10/2015 | Strass | B65G 47/918 414/798.2 |
| 2015/0284192 | A1* | 10/2015 | Hirschek | B65G 47/5181 414/222.08 |
| 2015/0321864 | A1* | 11/2015 | Gallucci | B65H 3/0816 271/3.08 |

FOREIGN PATENT DOCUMENTS

| | | |
|---|---|---|
| EP | 0691291 A1 | 1/1996 |
| FR | 2528406 A1 | 12/1983 |
| WO | WO 2008/108338 A1 | 9/2008 |
| WO | WO 2010/013549 A1 | 2/2010 |
| WO | WO 2010/041492 A1 | 4/2010 |

* cited by examiner

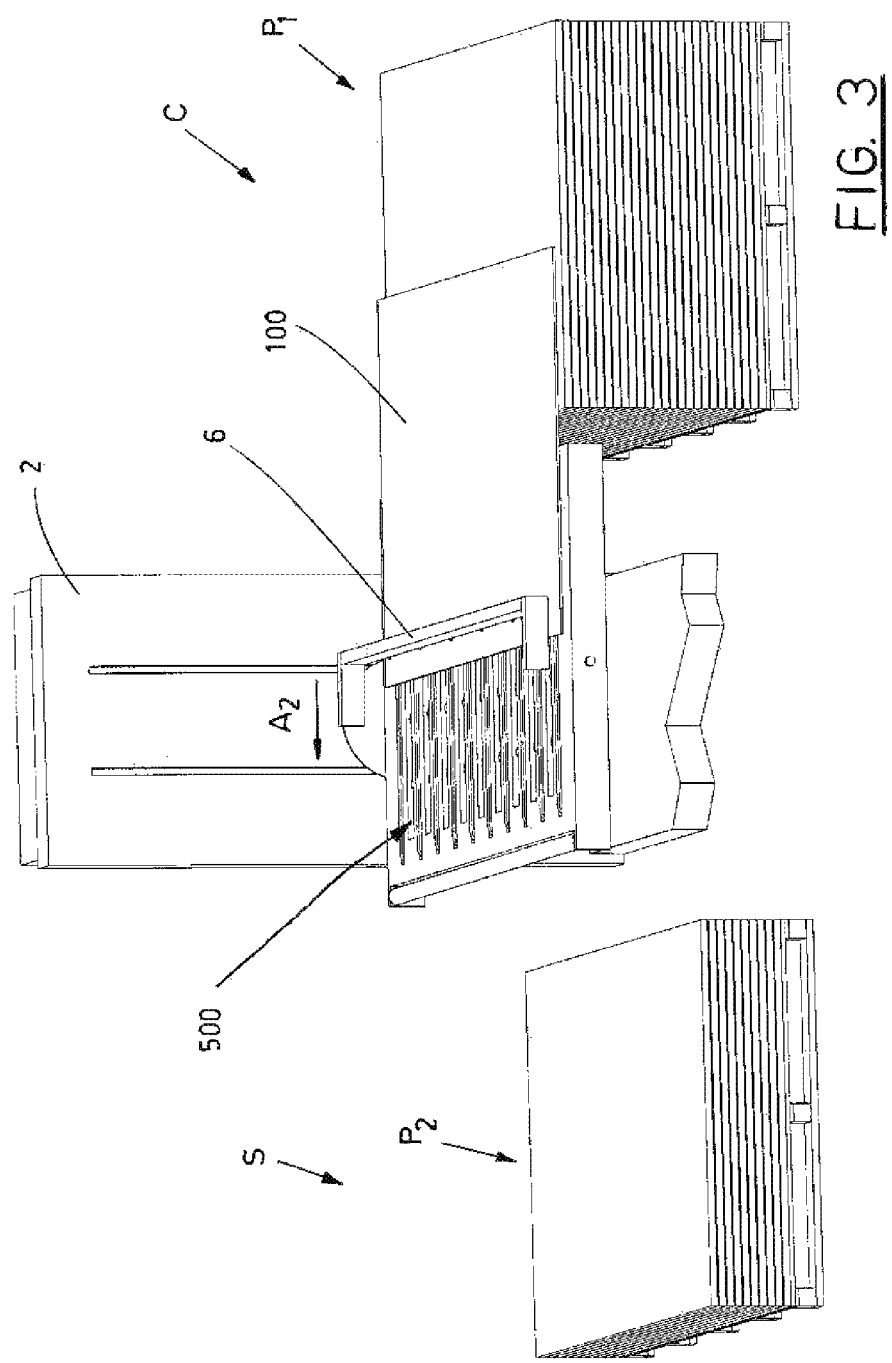

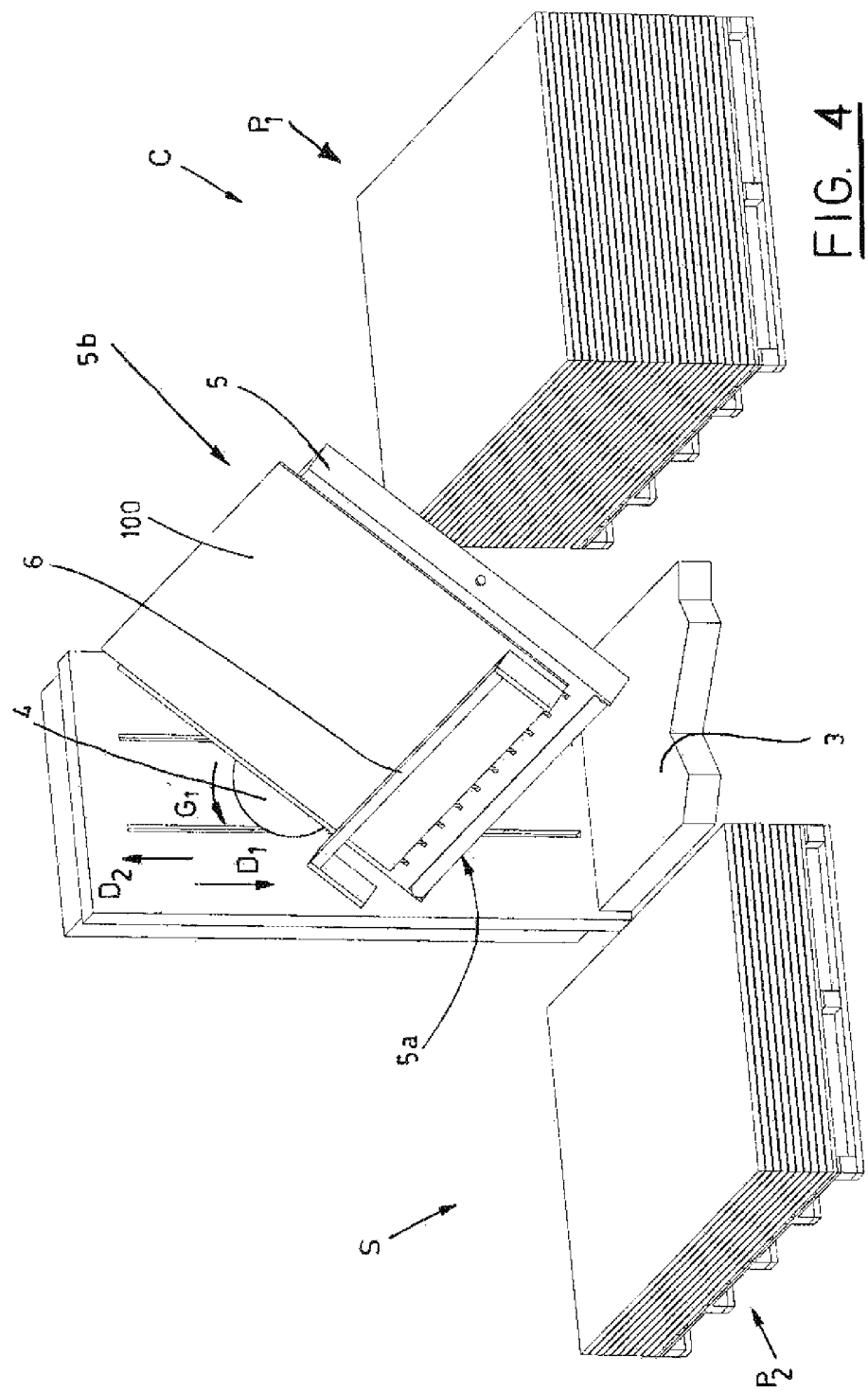

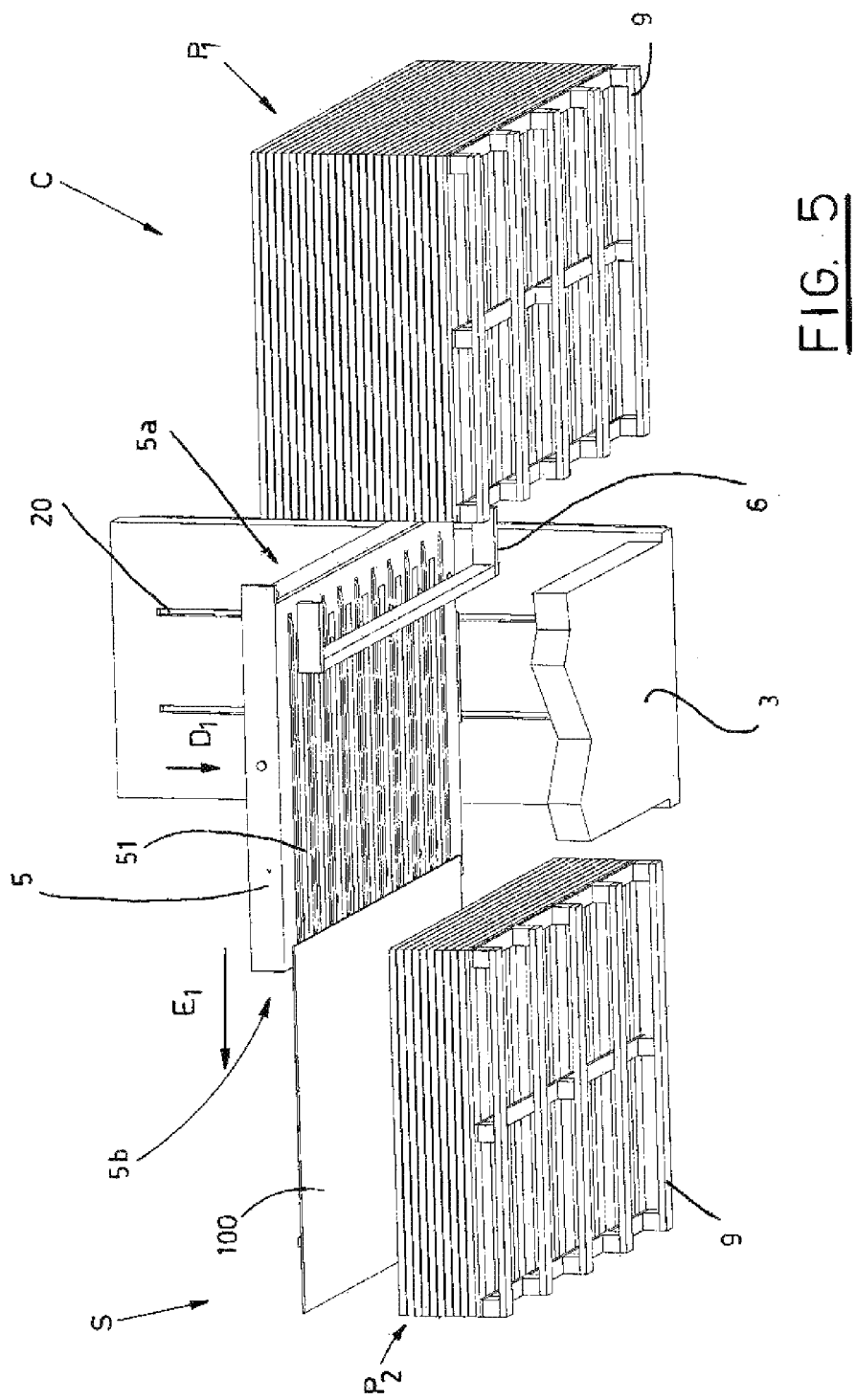

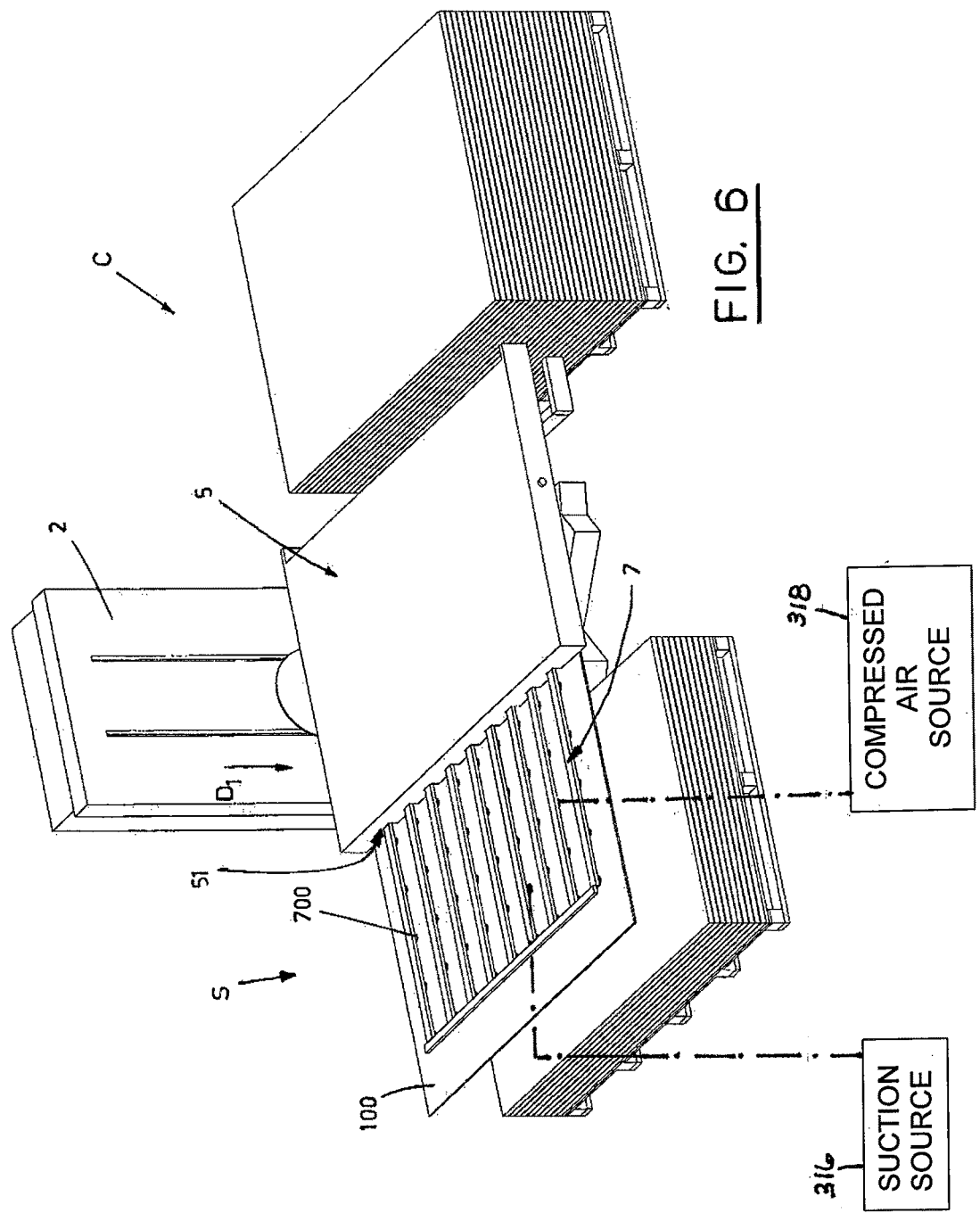

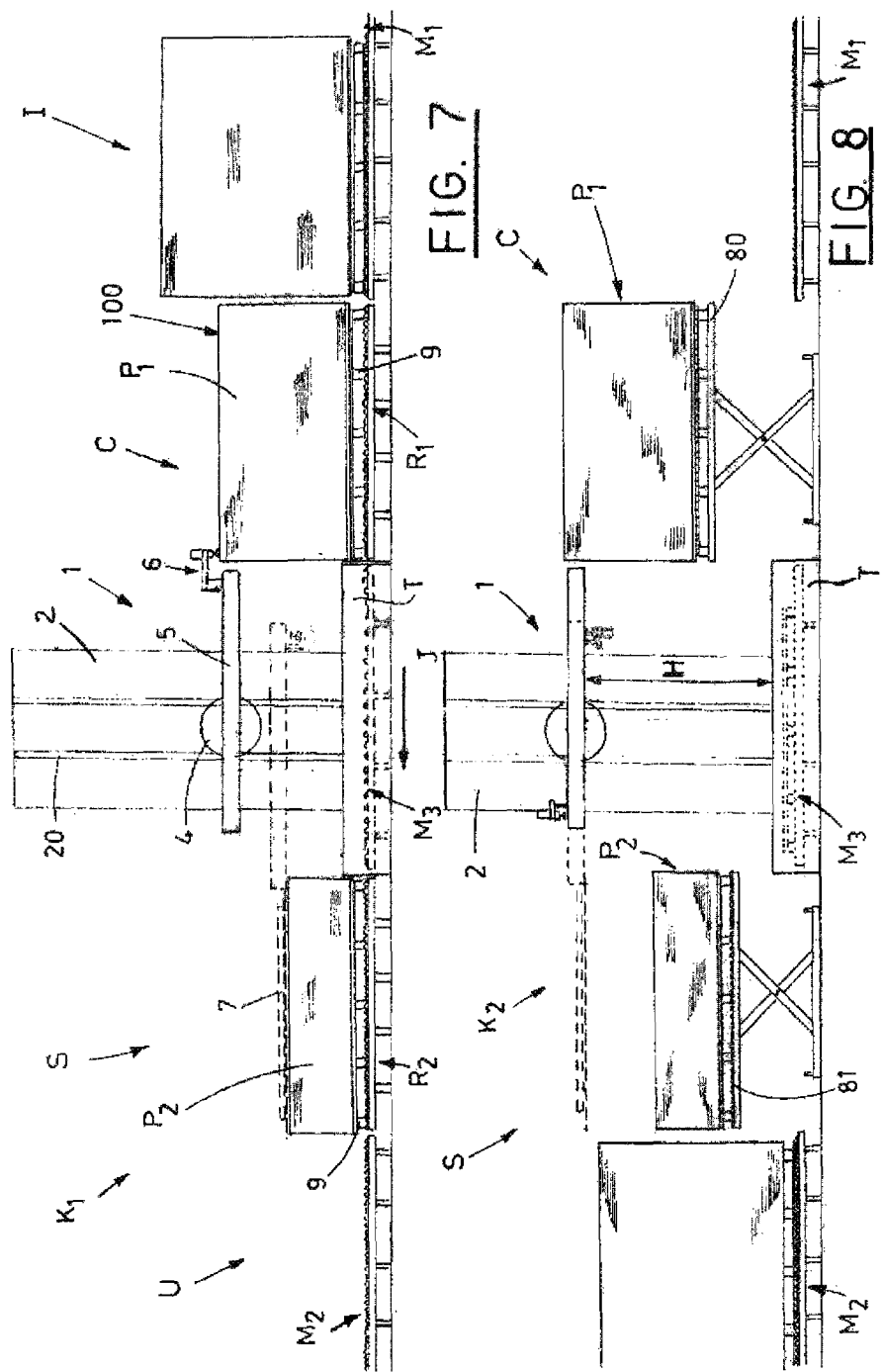

APPARATUS TO OVERTURN SHEETS AND/OR PANELS

SCOPE OF THE INVENTION

The present invention belongs to the technical area concerning the apparatuses to overturn sheets and/or panels.

DESCRIPTION OF THE KNOWN ART

Currently, in order to perform processing on sheets and/or panels, for example cutting and/or scoring printed sheets and/or panels, it is necessary to overturn the panels so that the printed face is laying down on a working surface and the face not affected by the printing is facing the tools performing the following operating steps thereon.

There exist apparatuses called "stack overturning" including two plates collecting and clamping a stack of sheets and/or panels in order to then overturn the whole stack; such apparatuses are used to overturn stacks formed by small/medium format of sheets and/or panels.

The sheets and/or panels having large dimensions can be overturned using very complex apparatuses, with all the drawbacks related thereto both in term of overall dimensions and architectural complexity, or manually by operators, who grab each sheet and/or panel, overturn it and place it on a corresponding working surface: the costs coming from using labor, whose productivity and reliability tends to decrease due to fatigue are evident.

SUMMARY OF THE INVENTION

The quality of the present invention is to propose an apparatus to overturn sheets and/or panels being realized combining/arranging means and/or devices by means of which individually overturning those sheets and/or panels being collected from a supply station of sheets and/or panels to be overturned and by means of which depositing said individual overturned sheets and/or panels in an unload station in order to obtain a second stack of overturned sheets and/or panels.

Another quality of the invention to propose an apparatus to overturn sheets and/or panels being realized in order to be able to be associated upstream or downstream therefrom, with machines for processing the same sheets and/or panels, or with systems to move and handle pallets.

A further quality of the invention is to propose a structurally simple and extremely functional apparatus, relatively to the performances being obtained therewith.

Those qualities are obtained according to the content of claims.

BRIEF DESCRIPTION OF THE DRAWINGS

The characteristics of the invention are highlighted in the following referring to the attached drawings where:

FIGS. 3-6 show different perspective schematic views of the apparatus in question in different operating positions, with some parts being removed in order to better highlight other parts;

FIG. 7 shows a side schematic view of a first system to move pallets to/from the apparatus to overturn sheets and/or panels in question, with some parts being removed in order to better highlight other parts;

FIG. 8 shows a side schematic view of a second system to move pallets to/from the apparatus in question, with some parts being removed in order to better highlight other parts;

DESCRIPTION OF PREFERRED EMBODIMENTS

Referring to the attached drawings, an apparatus to overturn sheets and/or panels is shown as 1.

Figure 1:
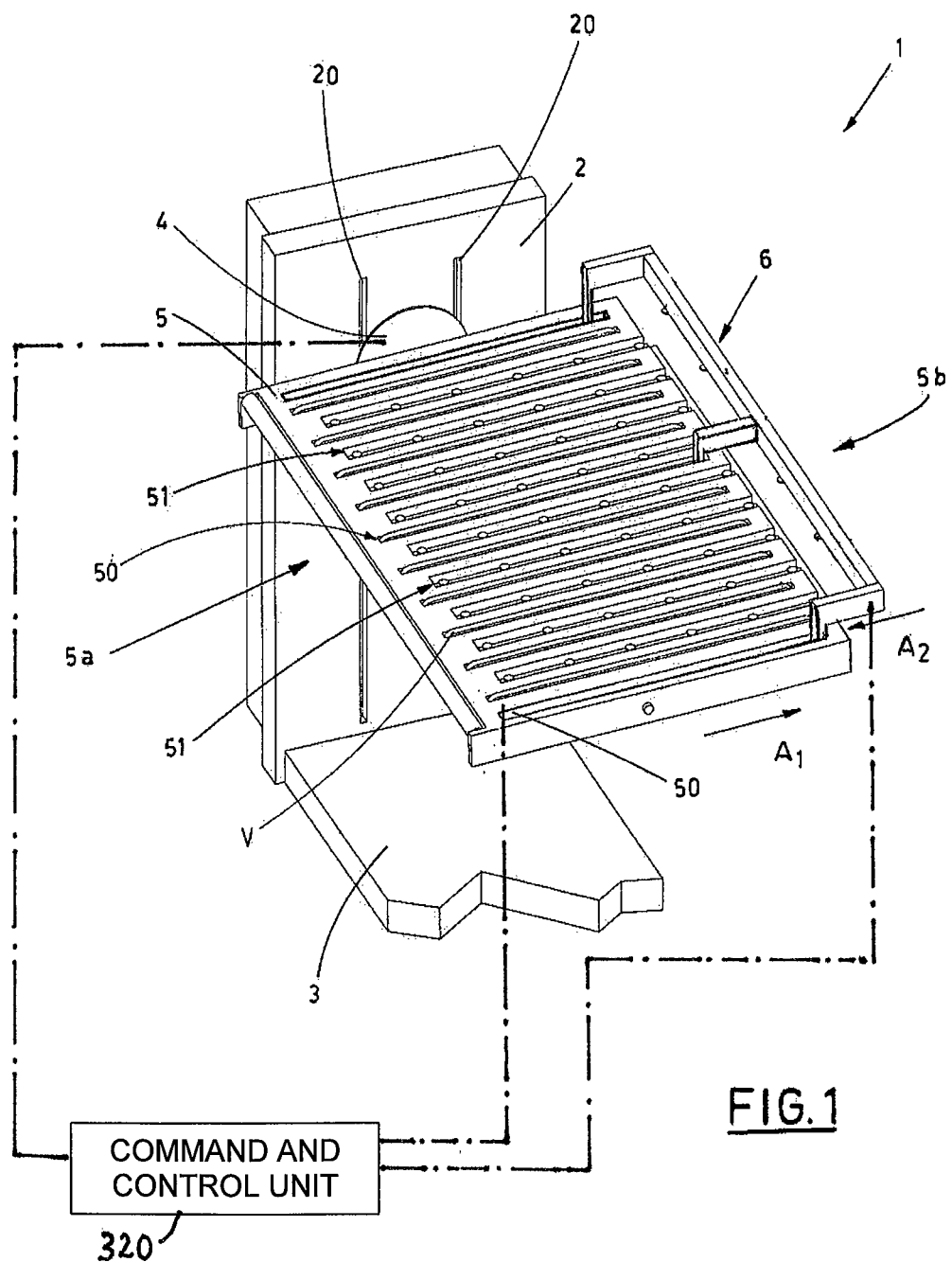
FIG. 1 shows a perspective schematic view of an apparatus to overturn sheets and/or panels object of the invention, with some parts being removed in order to better highlight other parts.
Figure 1A:
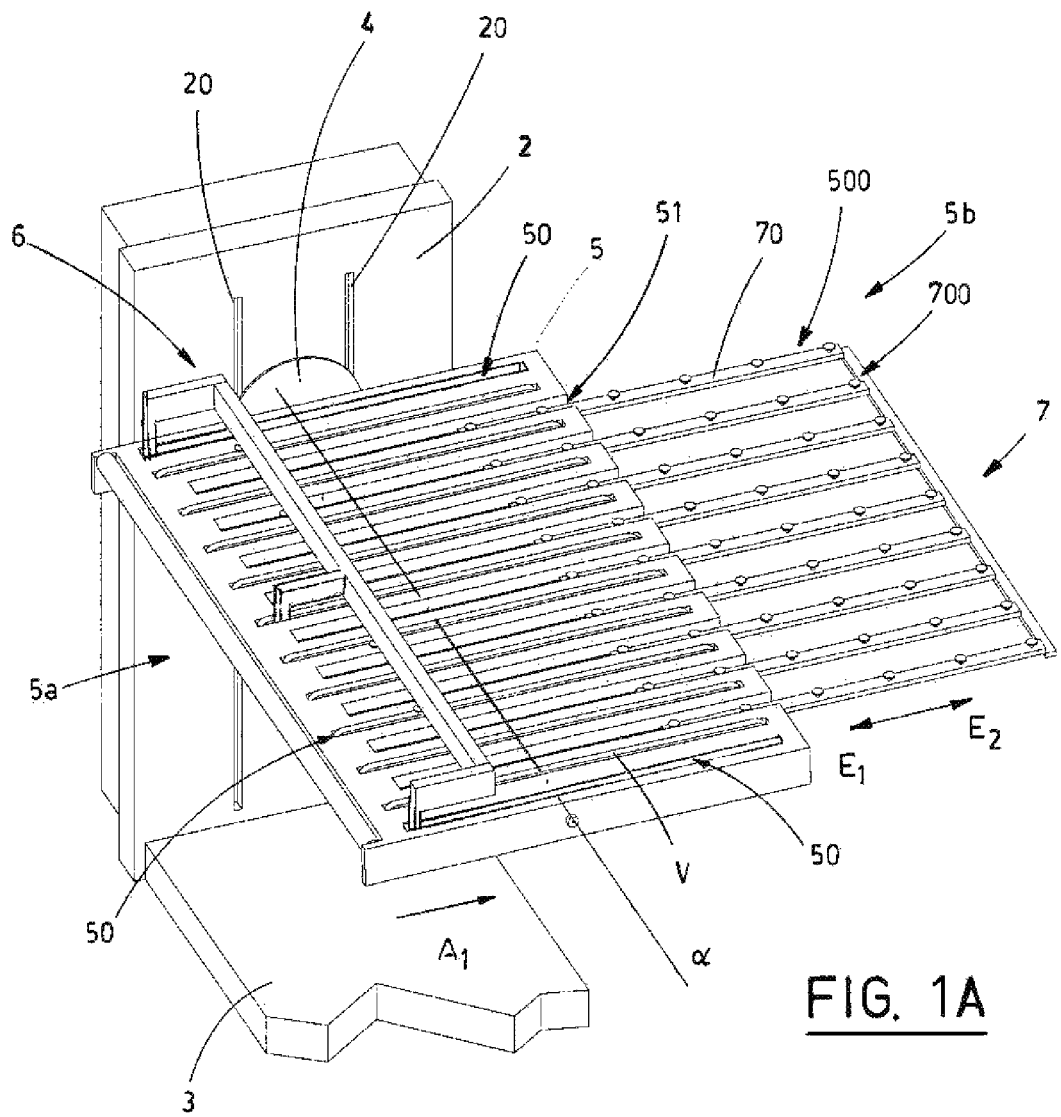
FIG. 1A shows the same perspective view of FIG. 1 with some operative positions of the parts constituting the apparatus in question being highlighted.
Figures 9A, 9B, 9C:
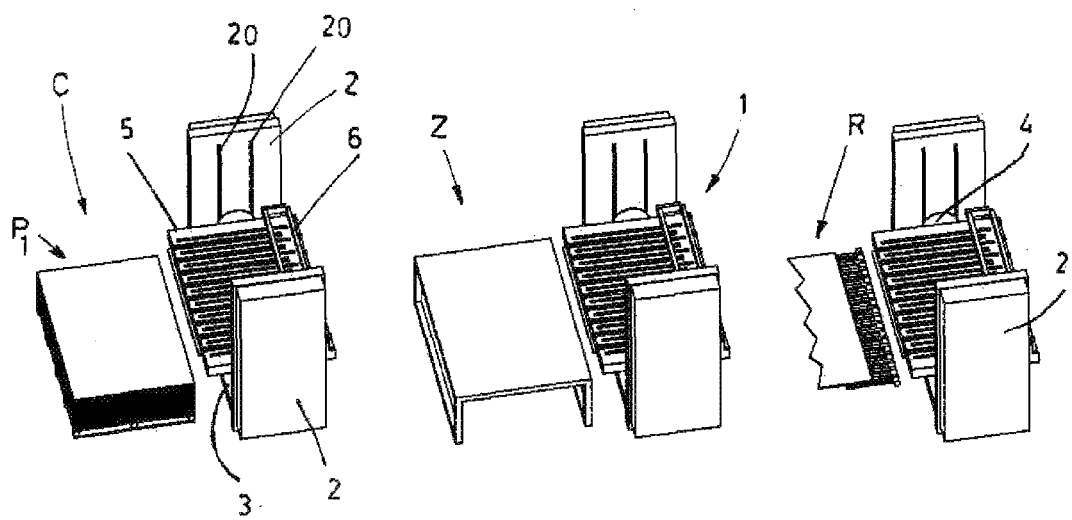
FIGS. 9A, 9B, 9C, 10A, 10B, 10C, show different perspective views, being opposite with respect the former ones, where as many use of the apparatus in question are visible.

The apparatus 1, as partially shown in FIG. 1, 1A, includes: two turrets 2, being anchored to a base 3, having vertical guiding channels 20; supporting means 4 being mobile inside said guiding channels 20 (FIG. 9A); a loading surface 5 carried by said supporting means 4, for example so that the same loading surface is offset with respect to the midpoint vertical axes of the turrets; roto-translation means, of a known type not shown, associated with the loading surface 5 and the supporting means 4, allowing both the vertical movement upward and downward of the supporting means 4 and the rotation of said loading surface 5 with respect to an axis a perpendicular to the vertical axes of the turrets 2.

The loading surface 5 has: first guiding grooves 50 in which corresponding grab means 6 are movable from a first side 5a of said loading surface 5 to the opposite second side 5b thereof, and vice versa (according to the direction of the arrows A1, A2, of FIGS. 1, 1A); second guiding grooves 51 in which the longitudinal rods 70 of a comb frame 7, being actuated from related transferring means not shown are movable from the first side 5a outwardly the loading surface 5, and vice versa, according to the direction of the arrows E1, E2, (FIG. 1A).

The grab means 6, for example as shown in FIGS. 1, 1A, 2-6, include: a rod being movable by means of known actuating systems not shown, from the first side 5a of said loading surface 5 to the opposite second side 5b in said first guiding grooves 50, having suction cup means, mechanical means or the same, relatively to the face opposed to the loading surface.

Figure 1B:
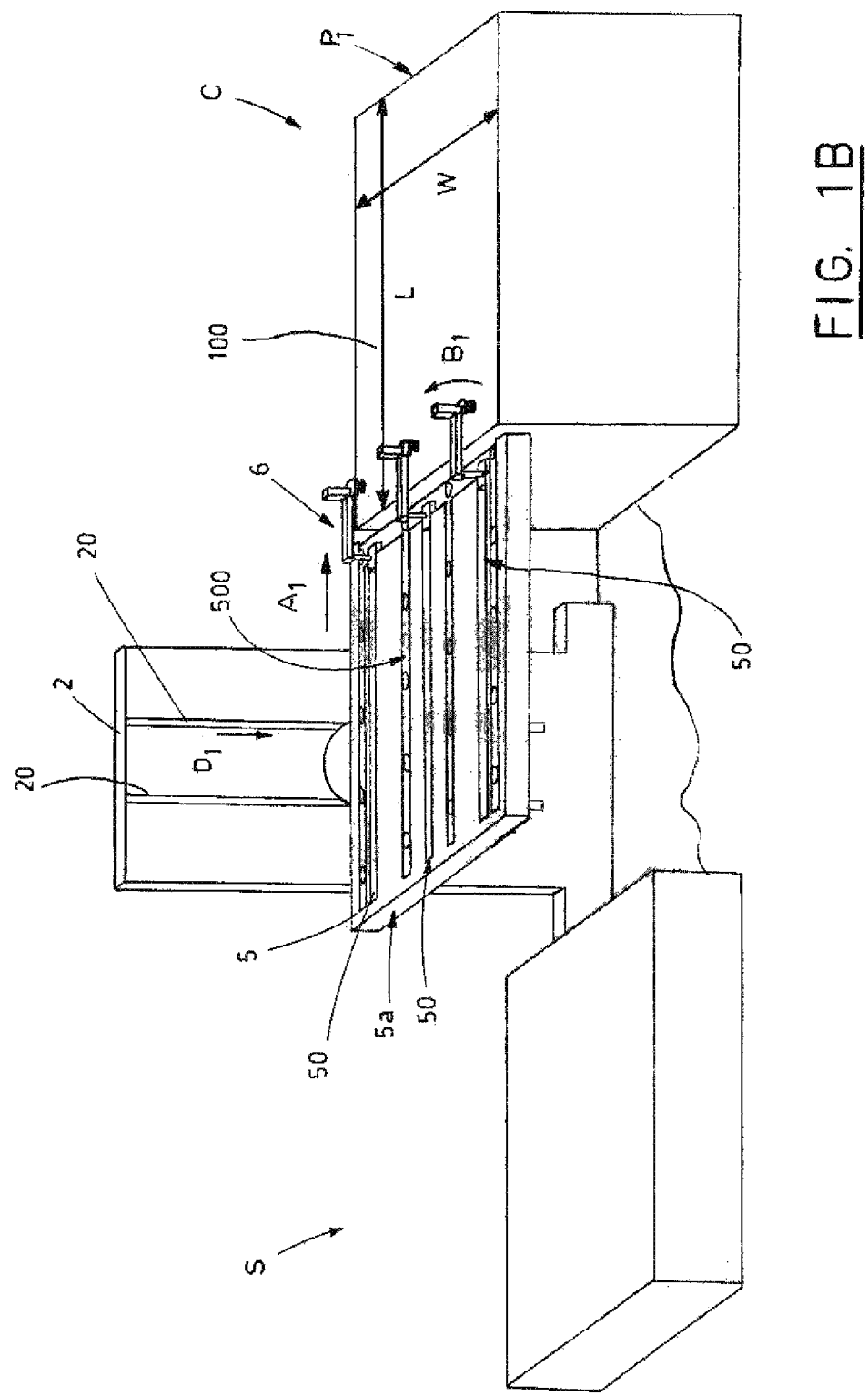
FIG. 1B shows a perspective schematic view of a variation of parts of the apparatus in question, with some parts being removed in order to better highlight other parts.

The grab means 6 in a variation shown in FIG. 1B include arms being hinged at one end to corresponding supports, being movable too in the first guiding grooves 50, and having mechanical means or the same at the end free from suction cup means.

In a further embodiment, the grab means 6 are replaced by conveying means V, for example conveyor belts being partially housed in said first guiding grooves 50, on which the sheets and/or panels to be overturned are sent.

The frame 7 has known stabilizing means 700 (for example being defined by sucking cups or holes, subjected to a suction source 316 and, possibly, a compressed air source 318 driven by known systems not shown); the external face of said frame 7 defines an operating surface 500.

To the apparatus 1 there is associated a command and control unit 320 controlling the roto-translation means of said supporting mean 4 and said loading surface 5, the grab means 6, the stabilizing means 700 being provided in the frame 7 and the transferring means thereof.

Figure 2:
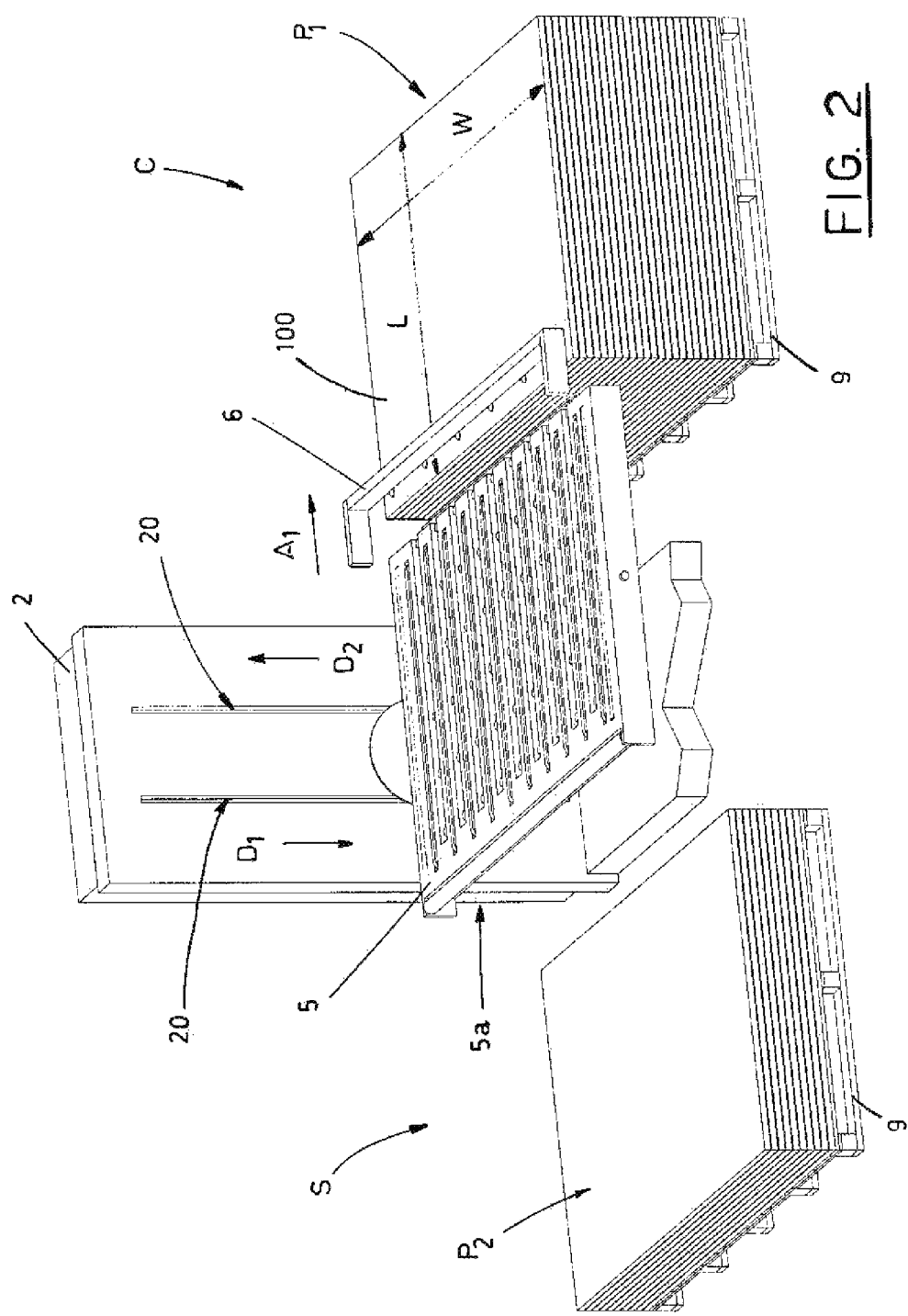
FIG. 2 shows a perspective schematic view of the apparatus in question, with some parts being removed in order to better highlight other parts, highlighting a first operating position of the means constituting it.

The apparatus 1, as shown in FIG. 2, can be placed downstream from a supply station C, in which, for example, a first stack P1 of sheets and/or panels 100 to be overturned is provided, being arranged on a related pallet, and upstream from an unload station S, in which, for example, an empty pallet 9 and/or a second stack P2 of overturned sheets and/or panels is present.

Preferably, the depth W of the first stack P1 is not greater than the width of the loading surface 5 of the apparatus 1, while the longitudinal dimension L of said first stack P1 is lower than, equal to, or greater than the longitudinal dimension of the same loading surface 5.

The operation of the proposed apparatus 1, as shown in FIGS. 1-6, provides either that an operator, with the help of known devices, not shown, puts a first stack P1 of sheets and/or panels to be overturned in the supply station C or that, as shown in the FIGS. 7, 8, and more clearly described in the following, said apparatus 1 is associated with a first or second system K1, K2, to move and handle pallets.

The loading surface 5 is moved in order to take a collection position, wherein it is vertically moved along the turrets 2 until positioning at the supply station C.

In case said supply station C the first stack P1 of sheets and/or panels is provided, the loading surface positions at the top sheet and/or panel of said first stack P1: such a collection position is variable in height because it depends on the height of the first stack P1, which decreases due to the intermittent collecting the top sheets and/or panels therefrom.

Actually, the apparatus 1 includes detecting means, not shown because known art, being associated to the loading surface 5 which detect the height of the top sheet and/or panel of the first stack P1 in order to detect the height where the loading surface 5 must be placed to collect said top sheet and/or panel; those detecting means, being also provided in the unload station S, are such to detect the height of an empty pallet and, later, the position of the top sheet of a stack P2 of sheets and/or panels being overturned and laid down on that pallet.

With the downwards D1, or upwards D2 vertical movement of the supporting mean 4, and thus of the loading surface 5, the operating surface 500 of the facing upwards frame 7 is placed side by side to the supply station C particularly, as shown in the FIGS. 1-6, side by side to the top sheet and/or panel of the first stack P1; the grab means 6, following their activation, move from the first side 5a of the loading surface 5 towards the second side 5b thereof, according to the direction of arrow A1, in order to place at the supply station C and engage the top sheet and/or panel 100 of said first stack P1 (FIG. 2).

Next, the grab means 6 slide in the opposite direction (according to the direction of arrow A2) to transfer the sheet and/or panel 100 on the loading surface 5 and, then, as a consequence on the operating surface 500 of the frame 7 (FIG. 3).

The grab means are deactivated, for example following the abutment with an end stop associated to the loading surface (not shown because known to those skilled in the art), in order to release the sheet and/or panel on the loading surface 5; the roto-translation means are activated in phase so that the loading surface 5 starts rotating with respect to said axis α (according to direction G1) according to known technique and systems.

The sheet and/or panel laid down on the loading surface 5 slides thereon until abutting known first mechanical stoppers (not shown) being associated near the first side 5a of said loading surface 5 in order to cause the activation of second side stoppers (not shown) which cause the proper placement and centering of the sheet and/or panel with respect to the operating surface 500 of the frame.

The stabilizing means 700 are activated in phase with the centering of the sheet and/or panel (with the activation of the sucking source) in order to engage and keep the sheet and/or panel adherent to the frame 7 itself.

In the variation shown in FIG. 1B, following the placement of the sheet and/or panel on the loading surface 5, the grab means 6 defined by arms are actuated to rotate with respect to an axis perpendicular to the loading surface 5, according to direction B1, in order to be parallel to the first side 5a of the loading surface 5 in a non-operative position.

Following the placement and anchoring of the sheet and/or panel to the operating surface 500 of the frame 7, the loading surface 5 continues to rotate with respect to the axis a according to direction G1 (FIG. 4) in order to be in a overturning position and face downwards said operating surface 500 resulting in an overturn of said sheet and/or panel 100 being engaged to said frame 7.

It should be noted that, following the collection and transfer of the sheet and/or panel form the supply station C to the operating surface 500, the loading surface 5 either moves vertically upwards (direction of arrow D2 of FIG. 4) in order to position at a preset height, which will be proportional to the dimension of the loading surface 5 itself, and the to rotate with respect to the axis a until the full overturn, or it is vertically moved upwards (direction of arrow D2 of FIG. 4) at the same time of the rotation of said loading surface 5 with respect to the axis α until the full overturn.

In phase with the overturning of the loading surface 5, and the sheet and/or panel 100 being anchored to the frame 7, the transferring means move the frame 7 in order to make it slide in the second guiding grooves 51, form the first side 5a of the loading surface outwardly from the latter (according to direction of arrow E1 of FIG. 5); still in phase, the supporting mean 4 is activated, moving downwards (according to the direction of arrow D1 of FIG. 5) the assembly including the loading surface 5, the frame 7 and the related sheet and/or panel 100, up to a height depending on the position of the unload station S and/or the height of the pallet 9, and/or later the top sheet and/or panel of the second stack P2, provided/formed in the unload station S, in order to define an unloading position (FIG. 6).

Therefore, the command and control unit 320 deactivates the stabilizing means 700 in order to allow releasing the overturned sheet and/or panel being anchored to said frame 7, which, as a consequence, falls on the pallet, or on the top sheet of said second stack P2 of overturned sheets and/or panels; in order to optimize that release, in phase with the deactivation of the sucking source associated to said stabilizing means 700, the connection to a compressed air source can be provided.

In a variation, not shown, it is possible to provide "probing" systems (not shown) on the loading surface which, following the rotation of the loading surface 5 and the exit of the frame 7, detect when the sheet and/or panel abuts the unload station S or the pallet, or the top sheet of the second stack P2 of overturned sheets and/or panels; the command and control unit 320 deactivates the stabilizing means 700 in phase in order to release the sheet and/or panel and to restore a new collection position when lifting the loading surface 5.

Following the release of the sheet and/or panel 100, the command and control unit 320 activates the already mentioned means in order to allow: the frame 7 to move along the second guiding grooves 51 from the outside of the loading surface 5 in order to restore the initial position; the supporting mean 4 to vertically move upwards (D2) to allow the loading surface 5 to rotate with respect to the axis a until orienting upwards the operating surface 500; the vertical movement of all the loading surface 5 up to an height depending on the height of a further sheet and/or panel provided in the supply station C.

The apparatus 1, as illustrated in FIG. 7, can be associated with a first system K1 to move and handle pallets 9 of sheets and/or panels to be overturned; said apparatus 1 is carried by a support T being interposed between the supply station C of the sheets and/or panels 100 to be overturned and the unload station S of the overturned sheets and/or panels.

The first system K1 includes: first conveying means M1 developing from an input station I to the supply station C and being arranged to convey the pallets 9, on which a stack P1 of sheets and/or panels to be overturned is placed, from the input station I to the supply station C; second conveying means M2 developing from the unload station S to an output station U and being arranged to convey a pallet 9 on which a second stack P2 of overturned sheets and/or panels 100 is placed; first supporting means R1 being arranged at the supply station C on which the pallet 9 stands, which supports a first stack P1 of sheets and/or panels to be overturned coming from the input station I; second supporting means R2 being arranged at the unload station S, on which an empty pallet 9 stands, on which sheets and/or panels being overturned by the apparatus 1 (provided upstream from said unload station S) are progressively placed in order to define a second stack P2 of overturned sheets and/or panels.

The first system K1 also includes third conveyors M3 being placed, as shown in FIG. 7, on said support T, or alternatively, in case said apparatus lays down on the ground, being fixed to the base thereof; those conveying means M3 being intended to convey an empty pallet 9along the longitudinal direction J from the supply station C to the unload station S.

Particularly, the first, second and third conveyors M1, M2, M3, the first and second supporting means R1, R2, are arranged being aligned and adjacent to each other, they are at a height less than the height where the loading surface 5 operates and are represented by roller conveyors.

The apparatus 1, as shown in FIG. 8, can be associated with the second system K2 to move and handle pallets 9 of sheets and/or panels to be overturned, wherein said apparatus 1 is carried by a support T being interposed between the supply station. C of the sheets and/or panels 100 to be overturned and the unload station S of the overturned sheets and/or panels.

The loading surface 5 of said apparatus 1 is carried by the turrets 2 up to a fixed height H with respect to the floor area: that fixed height H is proportional to the dimensions of the loading surface 5 in order to allow the latter to rotate about said axis a until its full overturn.

The second system K2 includes the first, second and third conveyors M1, M2, M3, being realized and placed as described for the first system K1, while: the first supporting means R1 are actuatable, for example by means of a lift or the same, so that the pallet 9, on which the first stack P1 of sheets and/or panels to be overturned is placed, can be vertically moved upwards so that the top sheet and/or panel of said first stack P1 is placed side by side to the operating surface 500 of the mentioned frame 7 and, next slowly upwards, to allow each time transferring the top sheet and/or panel of the first stack P1 on the operating surface 500, as previously described, and downwards when the pallet 9 is empty; the second supporting means R2 are actuatable so that the empty pallet 9 being placed in the unload station S can be vertically moved upwards in order to position side by side to the loading surface 5 and slowly downwards to allow each time transferring the overturned sheet and/or panel from the loading surface 5 to the pallet 9, as previously described, in order to define the second stack P2 of overturned sheets and/or panels.

In that second embodiment the first and second driving means R1, R2, each include a platform 80, 81, in turn having a roller table.

The apparatus to overturn sheets and/or panels 1 being object of the present invention has particularly advantageous characteristics.

That apparatus 1 allows overturning sheets and/or panels having great dimensions and/or different thickness, collecting and overturning sheets and/or panels being piled in stacks having different heights and collecting and possibly overturning sheets and/or panels coming from a conveying system.

Actually, with the vertical movement of the loading surface 5 positioning itself so that the operating surface 500 positions side by side, in the supply station C being upstream from the apparatus itself, to the sheet and/or panel being in said supply station C, or to the top sheet and/or panel of the stack, the apparatus 1 perfectly fits to the height of the stack from which it must collect and then overturn the sheet and/or panel.

The offset position of the rotation axis of the loading surface 5 together with the vertical movement thereof is advantageous because the loading surface, by moving vertically, can freely rotate between the obstacles identified by the respective supply C and unload S stations and up to the different heights of the stacks of sheets and/or panels.

Collection and transfer of the sheet and/or panel on the operating surface 500 of the frame 7 happen using the grab means 6 which grab (by means of sucking cups or mechanical means) and drag the top sheet and/or panel of the corresponding first stack P1 with the simple movement of the grab means 6 themselves: those grab means 6 can be deactivated either following the end of the transfer of the sheet and/or panel of the loading surface 5, or following the activation of the stabilizing means 700 being provided on the frame 7, or can cooperate with the latter in order to guarantee the placement and stabilization of the sheet and/or panel 100 on the operating surface 500 before, during and after the overturn of the loading surface 5 itself.

Providing the first mechanical stoppers and the second side stoppers to cause the centering of each sheet and/or panel with respect to the loading surface 5 is advantageous, because all the sheets and/or panels being transferred on the loading surface 5 will have the same engagement position with respect to the operating surface 500 guaranteeing the same release position of the sheets and/or panels in the unload station S.

Simply sliding downwards the loading surface 5 and extracting the frame 7 therefrom it is possible to place the sheet and/or panel, being collected from the supply station C and then overturned, in the unload station S on an empty pallet or on a top sheet and/or panel provided on a second stack P2 of overturned sheets and/or panels being created on said pallet.

That apparatus 1, as previously described, can be advantageously associated with first or second systems K1, K2, to move and handle pallets 9 of sheets and/or panels to be overturned, because using those systems the labor use is reduced to the minimum, with all the advantages implied in production and economic terms.

Further, the apparatus 1 can be placed upstream from a cutting machine for the sheets and/or panels in order to directly load the sheet and/or panel (to be cut) from the loading station C on the working surface where a cutting machine operates.

Figures 10A, 10B, 10C:
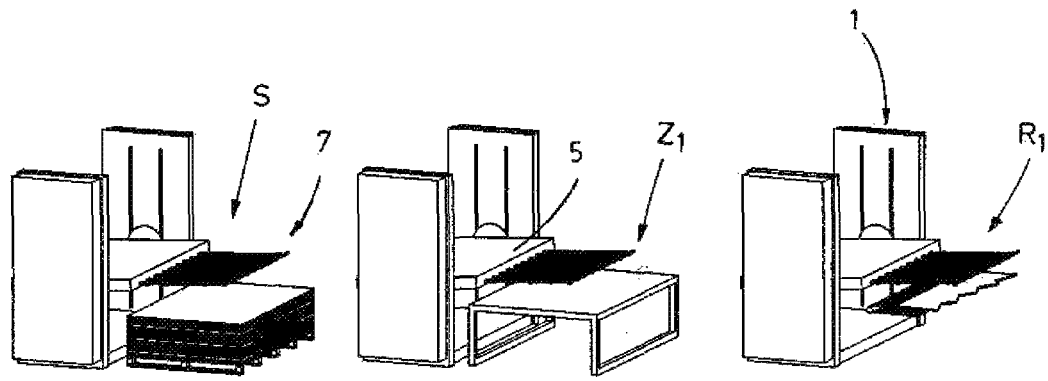

Alternatively, that apparatus can be placed at the output of a machine executing a printing, coating, laminating, etc. processing; the apparatus 1, as shown in the FIGS. 9A, 9B, 9C, 10A, 10B, 10C, must be placed so that the loading surface 5 of the apparatus itself is adjacent to the supply station C (FIG. 9A) and the unload station S (FIG. 10A); or to the supply station C (FIG. 9A) and the input area of any working surface Z1 of a machine (FIG. 10B); or to the supply station C (FIG. 9A) and the input area of a conveyor-like system R1 (FIG. 10C); or to any working surface Z where a sheet and/or panel (FIG. 9B) is placed and an unload station S (FIG. 10A); or to any working surface Z (FIG. 9B) and the input area of the working surface Z1 of any machine (FIG. 10B); or to any working surface Z (FIG. 9B) and the input area of a conveyor-like system R1 (FIG. 10C); or to the input area of a conveyor-like system R (FIG. 9C) and an unload station S (FIG. 10A); or to the input area of a conveyor-like system R (FIG. 9C) and any working surface Z1 (FIG. 10B); or to the input area of a first conveyor-like system R (FIG. 9C) and the input area of a second conveyor-like system R1 (FIG. 10C).

The apparatus, both in the above listed combinations and in other ones not described, allows the grab means 6 to collect and transfer the sheets and/or panels from the supply station/working surface/input area of a conveyor-like system, to the operating surface 500 of the frame 7, allows rotating the latter with the consequent overturn of the sheet and/or panel, and translating the frame 7 to position the sheet and/or panel being collected/overturned over a pallet/stack/unload station/working surface/input area of a conveyor-like system.

In one variation, not shown, in case the sheets and/or panels come from a conveyor-like system, on the loading surface 5, in place of the grab means 6, conveying means are provided over which each sheet and/or panel is sent: the sheet and/or panel lays on and moves forward with said conveying means until abutting a first mechanical stop being provided, for example, on the second side 5a of the loading surface 5.

Following the abutment of the mechanical stop, the advance of the conveying means is deactivated and, thanks to a second side stop, the proper placement of the sheet and/or panel with respect to the loading surface is provided.

The proper position of the sheet and/or panel is detected by known detecting means (not shown) being associated with the loading surface in order to allow, as previously described, the activation of the stabilizing means 700 to stabilize said sheet and/or panel being transferred on said operating surface 500 of the frame 7.

In another variation, not shown, both the grab means 6 and the conveying means can be associated with the loading surface 5, being both properly arranged on said surface to cooperate transferring one sheet and/or panel from a supply station C to the operating surface 500 of the frame 7.

The presence of the conveying means in the loading surface, through proper settings of the command and control unit 320, allows using the loading surface itself also only to transfer sheets and/or panels from a first to a second operating station.

The description of the apparatus and its operation has been carried out referring to the stacks P1, P2; it is understood that the stacks P1, P2 can be formed by a single sheet.

However, it is understood that the above has been described by way of a non-limiting example, therefore any detail modification, as well as variations of the movement systems of the loading surface 5, the grab means 6 and the stabilizing means 700, and variations of said loading surface 5, grab means 6 and stabilizing means 700 are intended to be included in the same protection scope, as it is claimed in the following.

The invention claimed is:
1. An apparatus for overturning sheets and/or panels, comprising:
   a bearing structure carrying a loading plane;
   roto-translation means for the vertical translation of said loading plane and for the rotation of said loading plane with respect to a rotation axis perpendicular to a vertical axis of the bearing structure;
   stabilization and transfer means of a sheet and/or panel, the stabilization and transfer means being carried by said loading plane, and being defining an operating surface;
   grab means, being carried by said loading plane, for the transfer of a sheet and/or panel from a supply station, being stopped upstream from said apparatus, on said operating surface;
   with said loading plane comprising first guiding grooves in which said grab means are movable from a first side of said loading plane to the opposite side thereof, and vice versa, and second guiding grooves in which said stabilization and transfer means are movable, from the first side outwardly the loading plane, and vice versa; and
   a command and control unit arranged and configured in order to command and control said roto-translation means, said stabilization and transfer means and said grab means, in order to define for said loading plane, in combination with the activation and/or deactivation of said roto-translation means, said stabilization and transfer means, and said grab means:
   a collection position wherein said operating surface is faced upward and side by side with the sheet and/or panel which is located in said supply station so that said grab means transfer said sheet and/or panel from said supply station on mentioned said operating surface in order to be coupled to the latter by means of said stabilization and transfer means;
   an overturning position wherein said loading plane is rotated with respect to said rotation axis for orienting downwardly said operating surface; and
   an unloading position, being driven in phase with the rotating of the loading plane, wherein said stabilization and transfer means arrange themselves over an unloading station placed downstream from said apparatus, in order to allow the release of the sheet and/or panel, which is carried by said operating surface, from the latter with consequent its release on said unloading station.

2. The apparatus for overturning sheets and/or panels according to claim 1 wherein said bearing structure is defined by at least one vertical turret, anchored to a base, on which a support is vertically movable carrying said loading plane with said support being subjected to said roto-translation means.

3. The apparatus for overturning sheets and/or panels according to claim 1 wherein said stabilization and transfer means are defined by a comb frame, whose external face defines said operating surface, with said frame comprising stabilization means which, following their activation, allow stabilizing the sheet and/or panel being transferred on said operating surface of said frame, and in that the longitudinal beams thereof, in order to define said unloading position, are made movable from a first side of said loading plane outwardly the latter along said second guiding grooves in order to transfer said sheet and/or panel, following the deactivation of said stabilization means, from said operating surface on said unloading station.

4. The apparatus for overturning sheets and/or panels according to claim 3 wherein said stabilization means are subjected to a suction source.

5. The apparatus for overturning sheets and/or panels according to claim 4 wherein said stabilization means, in said unloading position, are subjected to a compressed air source which is activated following the deactivation of said suction source, in order to help the release of the sheet and/or panel from said frame, with consequent fall of said sheet and/or panel being overturned over the pallet, or on the top sheet of said second stack of overturned sheets and/or panels.

6. The apparatus for overturning sheets and/or panels according to claim 1 wherein said grab means are defined by conveying means partially received in said first guiding grooves, on which said sheets and/or panels coming from said supply station are directed, with said conveying means being controlled by said command and control unit in order to allow the positioning of each of said sheets and/or panels on said operating surface, and being activated following the collection of a sheet and/or panel from said supply station and being deactivated following the abutment of a stop abutment following the transfer of the sheet over the loading plane.

7. An apparatus for overturning sheets and/or panels, comprising:
   a bearing structure carrying a loading plane;
   rotation means for the rotation of loading plane with respect to a rotation axis perpendicular to a vertical axis of the bearing structure;
   stabilization and transfer means for a sheet and/or panel, the stabilization and transfer means being carried by said loading plane, and defining an operating surface;
   grab means, being carried by said loading plane, for the transfer of a sheet and/or panel from a supply station, being placed upstream from said apparatus, on said operating surface;
   first vertical movement means of first supporting means of said supply station;
   second vertical movement means of an unloading station, which is carried by second supporting means provided for downstream from said apparatus;
   with said loading plane comprising first guiding grooves in which corresponding said grab means are movable from a first side of said loading plane to the opposite side thereof, and vice versa, and second guiding grooves in which said stabilization and transfer means are movable from the first side outwardly the loading plane, and vice versa; and
   a command and control unit arranged and configured to command and control said rotation means, said stabilization and transfer means, said grab means and said first and second vertical movement means in order to define for said loading plane:
   a collection position, wherein said operating surface is faced upward and side by side with said supply station so that said grab means transfer said sheet and/or panel from said supply station on said operating surface in order to be coupled to the latter by means of said stabilization and transfer means;
   an overturning position wherein said loading plane is rotated with respect to said rotation axis until facing downwardly said operating surface; and
   an unloading position, being driven in phase with the above-mentioned rotating of said loading plane, wherein said stabilization and transfer means arrange themselves over said underlying second supporting means or on the unloading station, in order to allow the release of the sheet and/or panel, which is carried by said operating surface, from the latter with consequent release of the sheet and/or panel on said unloading station.

8. The apparatus for overturning sheets and/or panels according to claim 7 wherein said bearing structure is defined by at least one vertical turret, anchored to a base, on which a support is vertically movable carrying said loading plane with said support being subjected to said roto-translation means.

9. The apparatus for overturning sheets and/or panels according to claim 7 wherein said bearing structure is defined by at least one vertical turret, anchored to a base, to which a supporting mean is associated carrying said loading plane so that the latter is positioned at a fixed height H, being proportional to the dimension of said loading plane with said support being subjected to said rotation means.

10. The apparatus for overturning sheets and/or panels according to claim 9 wherein said command and control unit is arranged and configured to move said first vertical movement means of said first supporting means of said supply station in order to position the sheet and/or panel located in the latter to be side by side with said operating surface, and to move also said second vertical movement means of said second supporting means of said unloading station so that the latter is positioned to be side by side with said loading plane.

11. The apparatus for overturning sheets and/or panels according to claim 7 wherein said stabilization and transfer means are defined by a comb frame, whose external face defines said operating surface, with said frame comprising stabilization means which, following their activation, allow stabilizing the sheet and/or panel being transferred on said operating surface of said frame, and in that the longitudinal beams thereof, in order to define said unloading position, are made movable from a first side of said loading plane outwardly the latter along said second guiding grooves in order to transfer said sheet and/or panel, following the deactivation of said stabilization means, from said operating surface on said unloading station.

12. The apparatus for overturning sheets and/or panels according to claim 11 wherein said stabilization means are subjected to a suction source.

13. The apparatus for overturning sheets and/or panels according to claim 12 wherein said stabilization means, in said unloading position, are subjected to a compressed air source which is activated following the deactivation of said suction source, in order to help the release of the sheet and/or panel from said frame, with consequent fall of said sheet and/or panel being overturned over the pallet, or on the top sheet of said second stack of overturned sheets and/or panels.

14. The apparatus for overturning sheets and/or panels according to claim 7 wherein said grab means are defined by conveying means partially received in said first guiding grooves, on which said sheets and/or panels coming from said supply station are directed, with said conveying means being controlled by said command and control unit in order to allow the positioning of each of said sheets and/or panels on said operating surface, and being activated following the collection of a sheet and/or panel from said supply station and being deactivated following the abutment of a stop abutment following the transfer of the sheet over the loading plane.

* * * * *